United States Patent
Poizeau et al.

(10) Patent No.: US 11,502,306 B2
(45) Date of Patent: Nov. 15, 2022

(54) CATHODE LAYER INCLUDING IONIC CONDUCTOR MATERIAL AND ELECTRONIC CONDUCTOR MATERIAL

(71) Applicant: SAINT-GOBAIN CERAMICS & PLASTICS, INC., Worcester, MA (US)

(72) Inventors: Sophie Marie Claire Poizeau, Courbevoie (FR); Juliette Lea Marylou Maria, Paris (FR); John D. Pietras, Sutton, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 514 days.

(21) Appl. No.: 16/442,255

(22) Filed: Jun. 14, 2019

(65) Prior Publication Data

US 2019/0386317 A1    Dec. 19, 2019

(30) Foreign Application Priority Data

Jun. 14, 2018    (FR) ...................................... 1855248

(51) Int. Cl.
| | | |
|---|---|---|
| *H01M 4/86* | (2006.01) | |
| *C25B 11/04* | (2021.01) | |
| *C25B 11/069* | (2021.01) | |
| *H01M 8/12* | (2016.01) | |

(52) U.S. Cl.
CPC ......... *H01M 4/8647* (2013.01); *C25B 11/069* (2021.01); *H01M 4/8673* (2013.01); *H01M 2004/8689* (2013.01); *H01M 2008/1293* (2013.01)

(58) Field of Classification Search
CPC .................... H01M 2004/021; Y02E 60/10
See application file for complete search history.

(56) References Cited

U.S. PATENT DOCUMENTS

| | | | |
|---|---|---|---|
| 6,692,855 B1 * | 2/2004 | Aizawa ............... | H01M 4/9066 429/479 |
| 9,318,766 B2 | 4/2016 | Kim et al. | |

(Continued)

FOREIGN PATENT DOCUMENTS

| | | |
|---|---|---|
| JP | 2000044245 A | 2/2000 |
| KR | 1020100062456 A | 6/2010 |
| KR | 101274809 B1 | 6/2013 |

OTHER PUBLICATIONS

International Search Report and Written Opinion for PCT/US2019/037360, dated Oct. 1, 2019, 10 pages.

(Continued)

*Primary Examiner* — Imran Akram
(74) *Attorney, Agent, or Firm* — Abel Schillinger, LLP; Thomas H. Osborn

(57) ABSTRACT

An electrochemical device can include a cathode layer including an ionic conductor material and an electronic conductor material. The cathode layer can include a ratio of (Vi/Ve) of a volume of the ionic conductor material (Vi) to a volume of the electronic conductor material (Ve) of at least 1.3. In an embodiment, the cathode layer can include a median surface diffusion length (Ls) greater than 0.33 microns. In an embodiment, the cathode layer can include a cathode functional layer.

20 Claims, 4 Drawing Sheets

(56) References Cited

U.S. PATENT DOCUMENTS

| | | | | |
|---|---|---|---|---|
| 2003/0099884 A1* | 5/2003 | Chiang | ............ | H01M 10/0436 429/231.95 |
| 2004/0031689 A1* | 2/2004 | Lim | ........................ | C25B 11/00 204/644 |
| 2004/0166380 A1 | 8/2004 | Gorte et al. | | |
| 2007/0015045 A1 | 1/2007 | Lee et al. | | |
| 2010/0101965 A1* | 4/2010 | Sasaki | ................ | G01N 27/3271 204/412 |
| 2010/0159356 A1 | 6/2010 | Mahoney | | |
| 2012/0009503 A1* | 1/2012 | Haug | ................. | H01M 8/1004 429/523 |
| 2012/0164529 A1* | 6/2012 | Bahr | ...................... | H01M 4/386 977/948 |
| 2012/0219858 A1* | 8/2012 | Nakabayashi | ...... | H01M 4/1395 429/219 |
| 2012/0231326 A1* | 9/2012 | Biswal | ................. | H01M 4/661 977/734 |
| 2013/0101902 A1* | 4/2013 | Son | ........................ | H01M 4/13 429/232 |
| 2014/0170531 A1* | 6/2014 | Mohanram | ......... | H01M 4/8663 429/532 |
| 2015/0004526 A1* | 1/2015 | Kim | .................... | H01M 4/8857 429/535 |
| 2015/0010843 A1* | 1/2015 | Song | ................. | H01M 8/04119 429/465 |
| 2016/0056475 A1* | 2/2016 | Sawa | .................... | H01M 4/386 429/217 |
| 2017/0005341 A1* | 1/2017 | Yu | ........................ | B01D 71/024 |
| 2017/0222265 A1* | 8/2017 | Inoue | .................... | H01M 4/364 |
| 2018/0083281 A1* | 3/2018 | Cheng | .................... | C01B 32/05 |
| 2019/0372150 A1* | 12/2019 | Busacca | ............ | H01M 10/0468 |

OTHER PUBLICATIONS

Fu, Y. et al., "Heterogeneous electrocatalysis in porous cathodes of solid oxide fuel cells", Electrochimica Acta 159 (2015), pp. 71-80.

Fu, Yeqing, "Theoretical and Experimental Study of Solid Oxide Fuel Cell (SOFC) Using Impedance Spectra", Jun. 2014, Massachusetts Institute of Technology, 107 pages.

Wilson, J. R. et al., "Effect of composition of (La0.8Sr0.2MnO3 -Y2O3-stabilized ZrO2) cathodes: Correlating three-dimensional microstructure and polarization resistance," Journal of Power Sources, 195, 2010, pp. 1829-1840.

* cited by examiner

CATHODE LAYER INCLUDING IONIC CONDUCTOR MATERIAL AND ELECTRONIC CONDUCTOR MATERIAL

CROSS-REFERENCE TO RELATED APPLICATION(S)

This application claims priority to French Patent Application No. 1855248, entitled "CATHODE LAYER AND ELECTROCHEMICAL DEVICE INCLUDING THE SAME," by Sophie Marie Claire POIZEAU et al., filed Jun. 14, 2018, which is assigned to the current assignee hereof and incorporated herein by reference in its entirety.

FIELD OF THE DISCLOSURE

The following is directed to cathode layers, and electrochemical devices including the cathode layers, and methods of forming the same.

DESCRIPTION OF THE RELATED ART

Electrochemical cells (e.g., fuel cells) can offer potentially clean, quiet and efficient power generation. Unlike thermal energy based engines, fuel cells use an electrochemical or battery-like process to convert the chemical energy associated with the conversion of hydrogen gas (and carbon monoxide for high temperature fuel cells) into water (and carbon dioxide for high temperature fuel cells) and into electricity. Among various types of fuel cells, solid oxide fuel cells (SOFC) use hard ceramic compounds of metal oxides (e.g., calcium or zirconium oxides) to form their components, for example, electrodes, electrolytes and interconnects. Typically, in solid oxide fuel cells, oxygen gas ($O_2$) is reduced to oxygen ions ($O^{-2}$) at the cathode, and a fuel gas, such as hydrogen ($H_2$) or a hydrocarbon, such as methane ($CH_4$), is oxidized with the oxygen ions to form water and carbon dioxide (from hydrocarbon) at the anode. Despite the advantages of clean and quiet power generation, fuel cell systems have faced a number of formidable market entry issues resulting from product immaturity, over-engineered system complexity, fuel efficiency, and etc. The industry continues to demand fuel cells with improved performance.

BRIEF DESCRIPTION OF THE DRAWINGS

The present disclosure may be better understood, and its numerous features and advantages made apparent to those skilled in the art by referencing the accompanying drawings.

Figure 1:
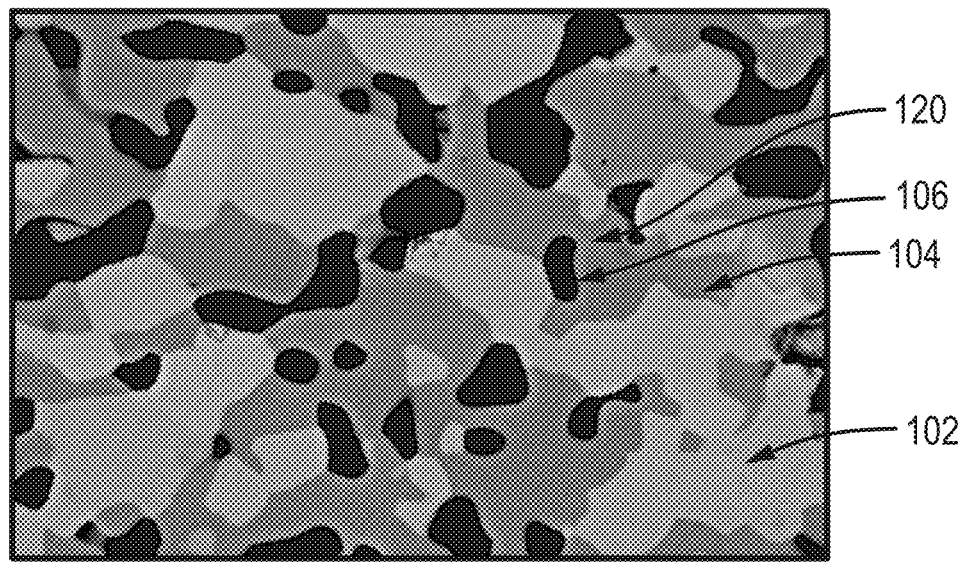
FIG. 1 includes a scanning electronic microscope image of a cross section of a cathode layer according to an embodiment disclosed herein.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

As used herein, the phrase "average particle diameter" refers to the median particle diameter, also commonly referred to in the art as $d_{50}$.

Unless otherwise defined, all technical and scientific terms used herein have the same meaning as commonly understood by one of ordinary skill in the art to which this invention belongs. The materials, methods, and examples are illustrative only and not intended to be limiting.

Embodiments relate to a cathode layer including an ionic conductor material and an electronic conductor material. The cathode layer can have an improved microstructure having features including a certain median surface diffusion length (Ls) that can help to improve performance and properties of the cathode layer, such as the area specific resistance or impedance. Further embodiments are related to electrochemical devices including the cathode layer. Such devices can include, for instance, a fuel cell (e.g., solid oxide fuel cell), a solid electrolyzer cell, a button cell battery, or the like. The devices can have improved performance, such as power density. In a particular embodiment, the cathode layer can be a cathode functional layer, and the electrochemical devices can include a cathode bulk layer adjacent to the cathode functional layer. Additional embodiments are related to methods of forming the cathode layer with the improved microstructure. The methods can include, for instance, controlling a ratio (Vi/Ve), based on the volume content, of the ionic conductor material to the electronic conductor material, a ratio ($d_{50(i)}/d_{50(e)}$) of an average particle diameter of the ionic conductor material ($d_{50(i)}$) to an average particle diameter of the electronic conductor material ($d_{50(e)}$), or both, to help to form the cathode layer with the improved microstructure.

According to an embodiment, the cathode layer can include electronic conductor material including an inorganic material. An exemplary inorganic material can include an oxide. In a further embodiment, the electronic conductor material can include a rare earth element including, for example, lanthanum (La), a transition metal element, (e.g., manganese (Mn)), an alkaline earth element (e.g., strontium (Sr)), or any combination thereof. In another embodiment, electronic conductor material can include a perovskite. An exemplarily perovskite can include a lanthanum manganite material. In some applications, the lanthanum manganite material can include a dopant material, which can be selected from alkaline earth metal, lead, or generally cations having an atomic ratio of between about 0.4 and 0.9 Angstroms. For example, the dopant material can include an element including Mg, Ba, Sr, Ca, Co, Ga, Pb, Zr, or any combination thereof. In a particular embodiment, the dopant can include Sr, and more particularly, the electronic conductor material can be a lanthanum strontium manganite material, known generally as LSM. In particular embodiments, the electronic conductor material can consist essentially of LSM. In another embodiment, the electronic conductor material can include a spinel ($MgAl_2O_4$). In some applications, the cathode layer can include another electronic conductor material that is known to be a suitable cathode layer material in the art.

According to an embodiment, the cathode layer can include a certain content of the electronic conductor material, such as at least 15 vol % of a total volume of the cathode layer, that can facilitate formation of the cathode layer having improved properties and performance. For instance, the content of the electronic conductor material can be at least 18 vol % or at least 20 vol % or at least 22 vol % or at least 25 vol % of a total volume of the cathode layer. In another instance, the cathode layer can include at most 35 vol % of the electronic conductor material of a total volume of the cathode layer, such as at most 32 vol % or at most 30 vol % or at most 28 vol % or at most 25 vol % of a total volume of the cathode layer. Moreover, the content of the electronic conductor material can include any of the minimum and maximum percentages noted herein. For instance, the cathode layer can include at least 15 vol % and at most 40 vol % of the electronic conductor material of the total volume of the cathode layer.

In a particular embodiment, the cathode layer can include a cathode functional layer, wherein the cathode functional layer can include at least 18 vol % the electronic conductor material of a total volume of the cathode functional layer, such as at least 20 vol % or at least 22 vol % or at least 25 vol % of the total volume of the cathode functional layer. In another particular embodiment, the cathode functional layer can include at most 35 vol % of the electronic conductor material of the total volume of the cathode functional layer, such as at most 32 vol % or at most 30 vol % or at most 28 vol % or at most 25 vol % of the total volume of the cathode functional layer. Moreover, the cathode functional layer can include a content of the electronic conductor material including any of the minimum and maximum percentages noted herein.

According to an embodiment, the cathode layer can include an ionic conductor material, such as a ceramic material. For example, the ionic conductor material can include an oxide material. Some suitable oxides can include zirconia ($ZrO_2$), ceria ($Ce_2O_3$), an oxide of another rare earth element, or any combination thereof. In a particular embodiment, the ionic conductor material can include a zirconia-based material that can incorporate other elements such as stabilizers or dopants. Such elements can include yttrium (Y), ytterbium (Yb), cerium (Ce), scandium (Sc), samarium (Sm), gadolinium (Gd), lanthanum (La), praseodymium (Pr), neodymium (Nd), or any combination thereof. In at least one embodiment, the ionic conductor material can include $Y_2O_3$-doped $ZrO_2$, generally referred to as YSZ. In a non-limiting, particular embodiment, the ionic conductor material can include $ZrO_2$ doped with 8 mol % $Y_2O_3$ (e.g., 8 mol % $Y_2O_3$-doped $ZrO_2$ or referred to as 8YSZ), and more particularly, can consist essentially of 8YSZ. In another embodiment, the ionic conductor material can include $ZrO_2$ doped with 10 mol % $Y_2O_3$ (e.g., 10 mol % $Y_2O_3$-doped $ZrO_2$ or referred to as 10YSZ). In some instances, the ionic conductor material can include stabilized yttrium-zirconate (e.g., $Y_2Zr_2O_7$). In another embodiment, the ionic conductor material can include another suitable electrolyte layer material.

In a further embodiment, the zirconia-based material can include an element other than yttrium. For example, the ionic conductor material can include scandium, cerium, or a combination thereof. In a particular embodiment, the ionic conductor material can include scandia ($Sc_2O_3$) stabilized zirconia, such as $ZrO_2$ doped with 10 mol % $Sc_2O_3$ (e.g., 10 mol % $Sc_2O_3$-doped $ZrO_2$ or referred to as 10ScSZ). In another particular embodiment, the ionic conductor material can include scandia ($Sc_2O_3$) stabilized zirconia that is further doped with ceria ($Ce_2O_3$) (e.g., doped with 1 mol % $Ce_2O_3$). More particularly, the ionic conductor material can include 10 mol % $Sc_2O_3$–1 mol % $Ce_2O_3$-doped $ZrO_2$ (generally referred to as $10Sc1CeZrO_2$). In even more particular embodiments, the ionic conductor material can consist essentially of $10Sc1CeZrO_2$.

In a further embodiment, the ionic conductor material can include a ceria-based material that includes a dopant or a stabilizer element as noted in this disclosure. In some exemplary applications, the ionic conductor material can include samarium (Sm), gadolinium (Gd), lanthanum (La), yttrium (Y), calcium (Ca), or the like. In a further embodiment, the ionic conductor material can include $Sm_2O_3$-doped $CeO_2$ (generally known as SDC), $Gd_2O_3$-doped $CeO_2$ (generally referred to as GDC), $La_2O_3$-doped $CeO_2$ (generally referred to as LDC), $Y_2O_3$-doped $CeO_2$ (generally referred to as YDC), CaO-doped $CeO_2$ (generally referred to as CDC), or any combination thereof. In another embodiment, the ionic conductor material can include any ceria-based material, any zirconia-based material, or any combination thereof.

In particular embodiments, the cathode layer can include an YSZ and LSM, and more particularly, 8YSZ and LSM. In an even more particular embodiment, the cathode functional layer can consist essentially of an YSZ and LSM, such as 8YSZ and LSM. In another particular embodiment, the cathode functional layer can include 10ScSZ and LSM, or $10Sc1CeZrO_2$ and LSM. In an even more particular embodiment, the cathode functional layer can consist essentially of $10Sc1CeZrO_2$ and LSM.

In an embodiment, the cathode layer can include a certain content of the ionic conductor material, such as at least 50 vol % of a total volume of the cathode layer, that can facilitate formation of the cathode layer having improved properties and improved performance. In a further embodiment, the content of the ionic conductor material can be at least 52 vol % or at least 55 vol % or at least 58 vol % or at least 60 vol % of the total volume of the cathode layer. In another instance, the cathode layer can include at most 70 vol % of the ionic conductor material of a total volume of the cathode layer, such as at most 68 vol % or at most 65 vol % or at most 62 vol % or at most 60 vol % of the total volume of the cathode layer. Moreover, the content of the ionic conductor material can be in a range including any of the minimum and maximum percentages noted herein. For instance, the content of the ionic conductor material can be in a range from at least 50 vol % to at most 70 vol % of the total volume of the cathode layer.

In a particular embodiment, the cathode layer can include a cathode functional layer, wherein the cathode functional layer can include at least 52 vol % of the ionic conductor material for a total volume of the cathode functional layer, such as at least 55 vol % or at least 58 vol % or at least 60 vol % of the total volume of the cathode functional layer. In another particular embodiment, the cathode functional layer can include at most 70 vol % of the ionic conductor material of the total volume of the cathode functional layer, such as at most 68 vol % or at most 65 vol % or at most 62 vol % or at most 60 vol % of the total volume of the cathode functional layer. Moreover, the cathode functional layer can include a content of the ionic conductor material in a range including any of the minimum and maximum percentages noted herein.

FIG. 1 includes an illustration of a scanning electron microscope (SEM) image of a cross section of a representative cathode layer 100. As illustrated, the cathode layer 100 can include a light phase 102 including the electronic conductor material (referred to as electronic conductor phase or light phase in this disclosure), a dark phase 104 including the ionic conductor material (referred to as ionic conductor phase or dark phase in this disclosure), and a black phase of pores 106 (referred to as black phase in this disclosure).

In this disclosure, the volume contents of the electronic conductor material, ionic conductor material, and pores (described in more details later in this disclosure) are determined as follows. A cross section of the cathode layer or an article including the cathode layer can be prepared. The cross section is cut in a direction perpendicular to the plane of the cathode layer. The cut layer or article is mounted in a resin and the cross section is polished. SEM images are taken in grayscale and at spaced apart random locations of the cross section. The images are taken such that no or minimal halo effect around pore boundaries is visible. Turning briefly to FIG. 1, Halo effect 120, is a light colored outline around pores 106 that may overlap with a dark phase around the pores and is not to be considered as a light phase. The images are processed using the software, ImageJ of version 1.48, provided by the National Institutes of Health. Each image is segmented into 3 distinct shades as illustrated in FIG. 1 based on the atomic number contrast of the microscope. For each processed image, the software counts the area of the distinct phases separately and divides by the total area of the image to yield the contents of each phase. The average of at least 6 images is taken as the volume percent of the electronic conductor material, ionic conductor material, and porosity of the cathode layer. In a particular embodiment, the cathode layer can include the electronic conductor material and the ionic conductor material at a certain ratio (Vi/Ve), based on the volume content. For instance, the ratio (Vi/Ve) can be at least 1.3, which can facilitate formation of the cathode layer with improved microstructure and improved performance. In some instance, the ratio (Vi/Ve) higher than 1.3, such as at least 1.6 or at least 1.8 or at least 2.3 or at least 3, may be desired. In a particular embodiment, the ratio (Vi/Ve) can be greater than 2.5 or even at least 3 to help to further improve charge transfer resistance of the cathode layer. In another instance, the ratio (Vi/Ve) can be at most 4 to help to improve the area specific resistance of the cathode layer. In some applications, the ratio (Vi/Ve) can be at most 3 to allow both area specific resistance and charge transfer resistance to be improved. Moreover, the ratio (Vi/Ve) of the electronic conductor material to the ionic conductor material can be in a range including any of the minimum and maximum values noted herein. For instance, the ratio (Vi/Ve) can be in a range from at least 1.3 to at most 4. In a particular embodiment, the ratio (Vi/Ve) of the electronic conductor material to the ionic conductor material can be greater than 2.5 and at most 4.

In an embodiment, the cathode functional layer can have a certain thickness, such as at least 5 microns or at least 10 microns or at least 20 microns. In another embodiment, the thickness of the cathode functional layer can be at most 200 microns, such as at most 150 microns or 100 microns or at most 50 microns. Moreover, the thickness of the cathode functional layer can include any of the minimum and maximum values noted herein. For example, the cathode functional layer can have a thickness in a range from at least 5 microns and at most 200 microns.

Notably, the cathode functional layer can have an improved microstructure having features including a certain median surface diffusion length (Ls). A surface diffusion length (Ls) refers to half of the length of an interface between a pore and the electronic conductor phase. In this disclosure, the median surface diffusion length (Ls) of the functional layer is determined as follows.

Figure 2:
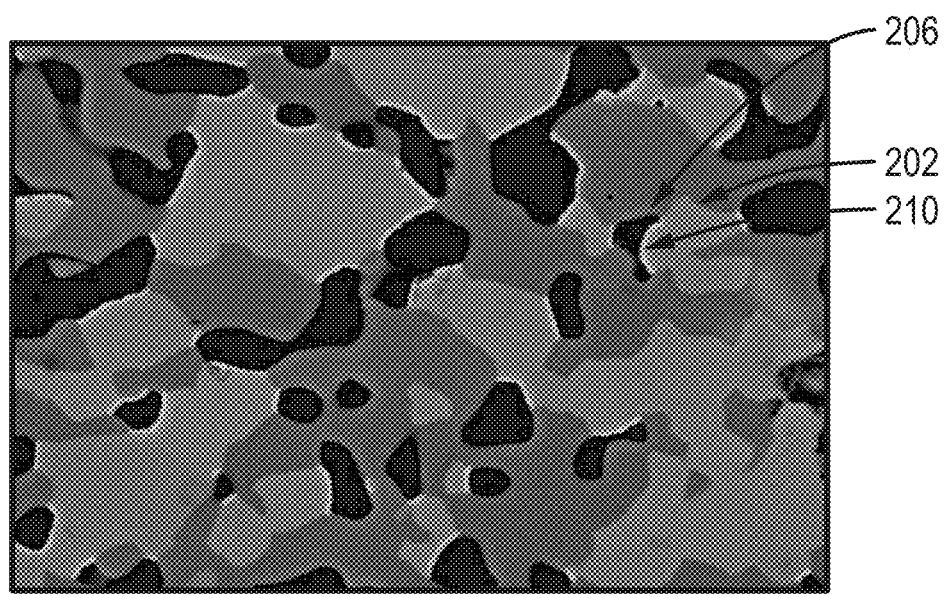
FIG. 2 includes another scanning electronic microscope image of a cross section of a cathode layer according to another embodiment disclosed herein.

A cross section of the cathode layer is prepared, and SEM images are taken and processed using the same software and in the same manner as noted above. The contrast can be achieved by utilization of a secondary backscatter detector. Interfaces between pores and electronic conductor phase can be selected manually or by the software. FIG. 2 includes an SEM image of a cathode cross section, where the interfaces between pores and electronic conductor phase are selected (lightened). As illustrated, an interface 210 between the pore 206 and the electronic conductor phase 202 is lightened, and the corresponding surface diffusion length (Ls) is half of the length of the interface 210. If auto selection is conducted by the software, the selection is examined to remove any selected length that is not an interface between a pore and electronic conductor phase. The software measures the total length of the selected interface and divides by 2 to obtain the Ls of the analyzed image. At least 6 image of a cross section and 3 sections are analyzed to determine the median Ls of the cathode.

According to an embodiment, the cathode layer can include a certain median Ls, such as greater than 0.33 microns, that can facilitate improved properties and performance of the cathode functional layer. In a further embodiment, the median Ls can be at least 0.35 microns or at least 0.39 microns. In another embodiment, the median Ls can be less than 0.57 microns. In still another embodiment, the median Ls can be less than 0.57 microns, such as at most 0.52 microns or at most 0.47 microns. Moreover, the median Ls can be in a range including any of the minimum and maximum values noted herein. For instance, the median Ls can be greater than 0.33 microns and less than 0.57 microns, or in a range from 0.35 microns to at most 0.55 microns.

According to a further embodiment, the cathode layer can include a certain ratio (Ls/lδ) of the mean Ls to a boundary layer length (lδ), such as greater than 1.1 or at least 1.2, that can facilitate improved performance of the cathode layer. In a further embodiment, the ratio (Ls/lδ) can be at most 3.0 or at most 2.9 or at most 2.8 or at most 2.7, or at most 2.6 or at most 2.5 or at most 2.4 or at most 2.3 or at most 2.2 or at most 2.1 or at most 2.0 or at most 1.9 or at most 1.8 or at most 1.7 or at most 1.6. Moreover, the ratio (Ls/lδ) can be in a range including any of the minimum and maximum values noted herein. The boundary layer length (lδ) refers to $$l_\delta = \sqrt{\frac{D_s}{k_{ads}}},$$

wherein $k_{ads}$ represents the adsorption kinetic rate parameter (also referred to as adsorption coefficient) of the electronic conductor material, and $D_s$ is the diffusion kinetic rate parameter (also referred to as diffusion coefficient) of the electronic conductor material. The characteristic length lδ can be calculated by fitting the AC impedance data of an electrochemical cell including the cathode functional layer that is measured under no-bias with the full Gerisher element described in "Heterogeneous Electrocatalysis in Porous Cathodes of Solid Oxide Fuel Cells", Fu et al., *Electrochimica Acta* 159 (2015) pp. 71-80, which is incorporated herein by reference.

In an embodiment, the cathode layer can include a certain porosity, such as at least 12 vol % of a total volume of the cathode layer, that can facilitate improved performance of the cathode layer. In a further embodiment, the porosity can be at least 15 vol % or at least 18 vol % of the total volume of the cathode layer. In at least one embodiment, the porosity can be at most 40 vol %, such as at most 38 vol % or at most 35 vol % or at most 32 vol %. Moreover, the porosity of the cathode layer can include any of the minimum and maximum percentages noted herein. For example, the cathode layer can be in a range from at least 12 vol % to at most 40 vol % or in a range from at least 15 vol % to at most 38 vol %. In another embodiment, the cathode layer can include a certain density of triple point boundary (TPB) points, such as greater than $0.30/\mu m^2$ and at most $4/\mu m^2$.

The cathode layer can be formed using powder materials having suitable particle sizes. In an embodiment, the powders can have a certain ratio $(d_{50(i)}/d_{50(e)})$ of the average particle diameter of the ionic conductor raw material $(d_{50(e)})$ to the average particle diameter of the electronic conductor raw material $(d_{50(e)})$, such as greater than 1.0 or at least 1.1, that can facilitate formation of the cathode layer having improved properties and performance. In a further embodiment, the ratio $(d_{50(i)}/d_{50(e)})$ can be at least 1.5 or at least 1.8. In another instance, the ratio $(d_{50(i)}/d_{50(e)})$ can be at most 4.8. Moreover, the ratio $(d_{50(i)}/d_{50(e)})$ can be in a range including any of the minimum and maximum values noted herein. For instance, the ratio $(d_{50(i)}/d_{50(e)})$ can be greater than 1.0 and at most 4.8.

The powders can be dispersed into an aqueous slurry and shaped to form a green cathode layer. A known binder material, such as polyvinyl, and/or pore inducers, such as graphite pore formers, may be added to the slurry to facilitate formation of the cathode layer. The term, "green", is intended to describe materials that have not undergone sintering to affect densification or grain growth. A green layer or article is an unfinished layer or article that may be dried and have low water content, but is unfired. A green layer or article can have suitable strength to support itself and other green layers formed thereon. Shaping can be performed through techniques known in the art including, but not limited to, casting, deposition, printing, extruding, lamination, die-pressing, gel casting, tape casting, spray coating, screen printing, roll compaction, injection molding, or a combination thereof. The green cathode layer can be assembled into a green article (e.g., an electrochemical cell), which can be fired to form an electrochemical cell including the cathode layer. Alternatively, the green cathode layer can be fired prior to being formed into a part of a cell. Firing can include a sintering process without applying exogenous pressure to the green article or cathode layer (e.g., free-sintering process), or a pressure assisted sintering process (e.g. hot pressing (HP), sinter forging, or the like). In some applications, two or more components of a green article may be sintered in a co-sintering process (sintering together at the same time) to form a sintered article. The cathode layer can be part of an electrochemical cell, such as a solid oxide fuel cell, a stack including a plurality of solid oxide fuel cell units, an electrolyzer, or the like. Firing can be conducted at a temperature in a range from at least 1000° C. to at most 1500° C. or in a range from at least 1050° C. to at most 1450° C. or in a range from at least 1100° C. to at most 1400° C. In certain embodiments, firing can be formed at a pressure at up to 20 MPa, such as in a range from 2 MPa to 18 MPa or in a range from 4 MPa to 16 MPa. In some applications, firing can be formed at atmospheric pressure.

Figure 3:
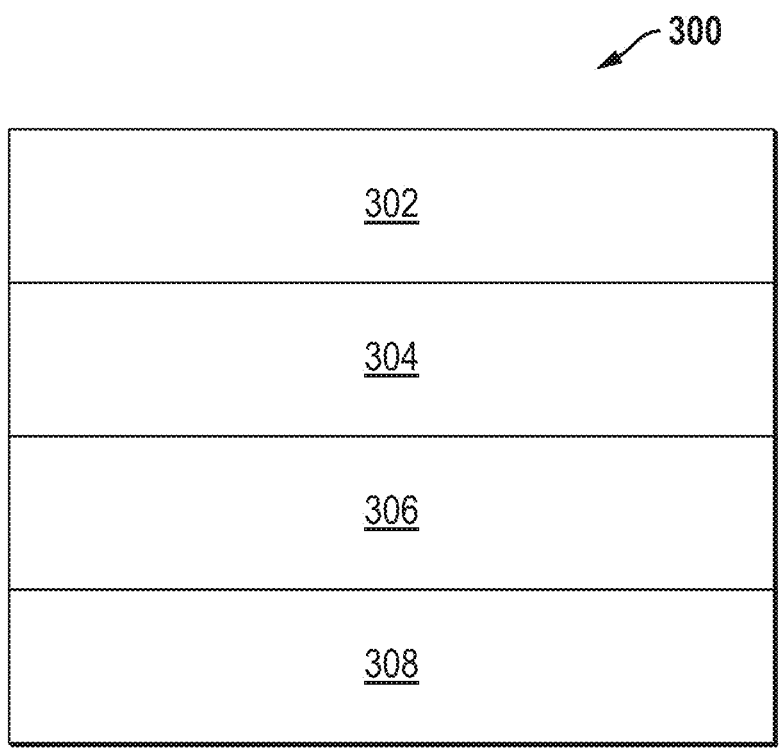
FIG. 3 includes an illustration of a fuel cell in accordance with an embodiment described herein.

In an embodiment, the cathode layer can include a cathode functional layer and optionally a cathode bulk layer. In a further embodiment, the cathode layer can be a cathode functional layer. FIG. 3 includes an illustration of a cross section of a fuel cell 300 including the cathode functional layer 304 overlying an electrolyte layer 306. The cathode functional layer 304 can be any cathode layer described in embodiments herein. The fuel cell 300 further includes a cathode bulk layer 302 overlying the cathode functional layer 304. An anode layer 308 underlies the electrolyte layer 306. As illustrated, the cathode functional layer 304 can be in direct contact with the electrolyte layer 306. The component layers of the fuel cell 300 can be formed separately (e.g., as green layers) and assembled together into the stack configuration illustrated in FIG. 3. Alternatively, the layers may be formed (e.g., in green state) in succession on each other. Hot pressing or sintering can be conducted to form a finally formed fuel cell 300. In some applications, a plurality of green fuel cells similar to fuel cell 300 can be formed in a stack and co-sintered. In a particular embodiment, the fuel cell 300 can be a solid oxide fuel cell. In another particular embodiment, the fuel cell 300 can be an electrolyzer cell.

Figure 4:
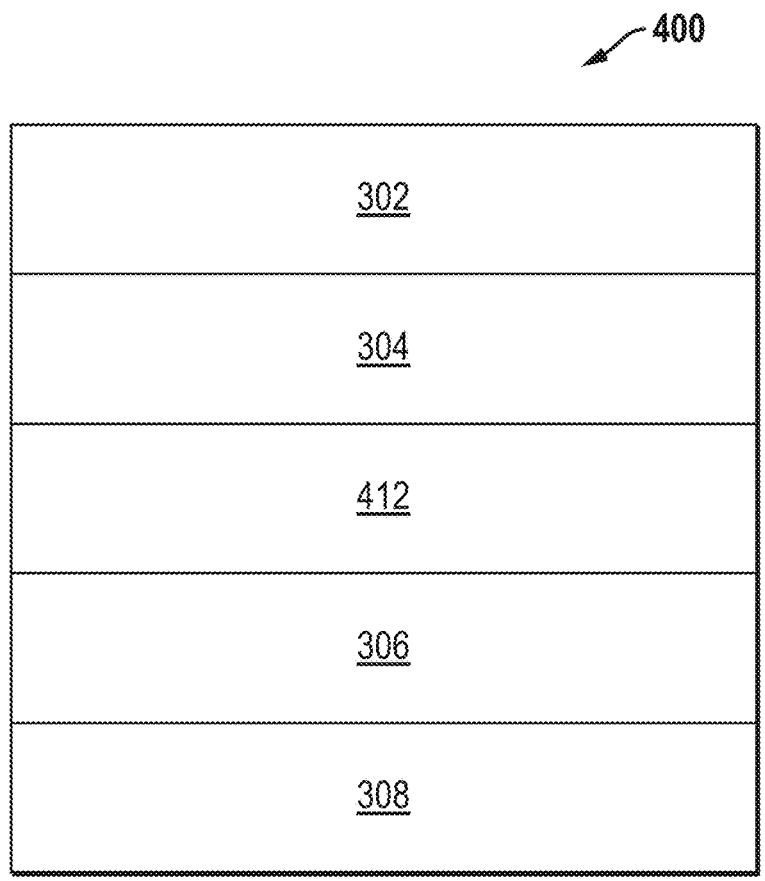
FIG. 4 includes an illustration of a fuel cell in accordance with another embodiment described herein.

FIG. 4 includes an illustration of a fuel cell 400 of another embodiment, where an interlayer 412 can be disposed between the cathode functional layer 304 and the electrolyte layer 206. In a further embodiment, the interlayer 412 can include an ionic conductor material noted in this disclosure, such as LDC, SDC, GDC, or the like. In another embodiment, the interlayer 412 can be formed including the same material as the electrolyte 306. In still another embodiment, the interlayer can include a different material than the electrolyte 306. In a particular embodiment, the interlayer may include an ionic conductor material other than a YSZ. As illustrated, the electrolyte layer 306 can be overlying the anode layer 308, and the cathode bulk layer 302 is disposed over the cathode functional layer 304.

The electrolyte layer 306 can be a thin, planar layer of material. In an embodiment, the electrolyte layer 306 can include an ionic conductor material noted in this disclosure and/or any other known material suitable for an electrolyte layer. In another embodiment, the electrolyte layer 306 can have a thickness in a range from 5 microns to 1 mm, such as in a range from 10 microns to 200 microns.

In an embodiment, the anode layer 308 can include a cermet material, that is, a combination of a ceramic and metallic material. Some suitable metals can include transition metal species, including for example, nickel or copper. The anode layer 308 can include an ionic conductor material noted in this disclosure, including for example, a zirconia-based material or a ceria based material. In some instances, oxide materials, such as titanates, manganites, chromites, or a combination thereof may be used in the anode layer 308. In another embodiment, the anode layer 308 can include a perovskite material.

Figure 5:
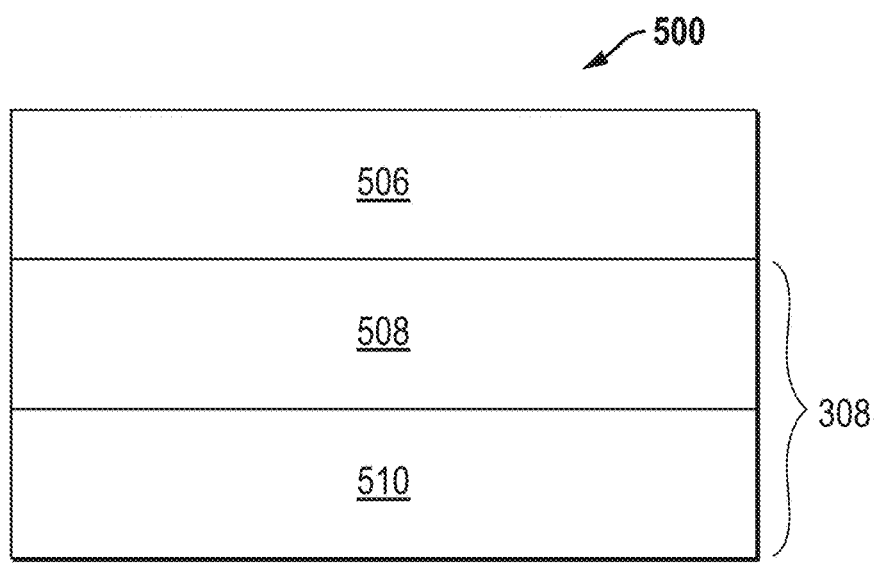
FIG. 5 includes an illustration of a portion of a fuel cell in accordance with another embodiment described herein.

In a further embodiment, the anode layer 308 can include an anode bulk layer and an anode functional layer. FIG. 5 includes an illustration of a portion of a solid oxide fuel cell 500 including the electrolyte layer 306 overlaying an anode bulk layer 508 and an anode functional layer 510 underlying the anode bulk layer 508. The anode bulk layer 508 and the anode functional layer 510 can include any of the anode material noted herein other suitable anode layer material known in the art. In an embodiment, the anode functional layer can include an ionic conductor material including those noted in this disclosure. In a particular embodiment, the anode functional layer can include a zirconia based material, and more particularly, a scandia doped zirconia. In an even more particular embodiment, the anode functional layer can include 20 vol % to 60 vol % of the ionic conductor material of the total volume of the anode functional layer.

The anode bulk layer 508 can include a thickness that is greater than the thickness of the anode functional layer 510. The thickness of the anode bulk layer 508 can be in a range from 50 microns to 2 mm or in a range from 100 microns to 1 mm or in a range from 150 microns to 800 microns. The anode bulk layer 508 can be a porous layer, having a porosity within a range between about 30 vol % and about 60 vol %, of the total volume of the anode bulk layer 508. Additionally, or alternatively, porosity of the bulk layer 508 can contain channels for delivery of the fuel to the anode functional layer 510.

The anode functional layer 510 can be in direct contact with the anode bulk layer 508. In an embodiment, the anode functional layer 510 can be a thin and substantially planar layer of material, having an average thickness in a range from 1 micron to 500 microns, such as from 5 micron to 300 microns or in a range from 10 microns to 100 microns. In another embodiment, the anode functional layer 510 can be a porous layer, having a porosity in a range from 20 vol % and to 50 vol % of the total volume of the anode functional layer 510.

The cathode bulk layer 302 can be in direct contact with the cathode functional layer 304. The cathode bulk layer 302 can include an electronic conductor material noted in the disclosure, or other known suitable material for forming a cathode layer. In some applications, the cathode bulk layer 302 can further include an ionic conductor material noted in the disclosure or known to be suitable for forming an electrolyte in the art. The cathode bulk layer 302 can have a thickness that is greater than the thickness of the electrolyte layer 306 or the cathode functional layer 304. For example, the cathode bulk layer 302 can have a thickness in a range from 50 microns to 2 mm or in a range from 100 microns to 1 mm or in a range from 200 microns to 800 microns. In another embodiment, the cathode bulk layer 302 can have a higher porosity than the cathode functional layer, having a porosity in a range from 30 vol % to 60 vol %. The cathode bulk layer 302 can include channels for delivery of oxygen (e.g., air) to the cathode functional layer 304.

In certain further embodiments, the fuel cell may further include an interconnect layer overlaying an anode layer. In an embodiment, the interconnect layer can include a chromite or nickel oxide material. In a further embodiment, the interconnect layer can include an element selected from the group consisting of lanthanum (La), manganese (Mn), strontium (Sr), titanium (Ti), niobium (Nb), calcium (Ca), gallium (Ga), cobalt (Co), yttria (Y), and a combination thereof. In certain instances, the interconnect layer can include a chromium oxide-based material, a nickel oxide-based material, cobalt oxide-based materials, or a titanium oxide-based material (e.g., lanthanum strontium titanate). In a particular embodiment, the interconnect layer can be made of a material, such as $LaSrCrO_3$, $LaMnCrO_3$, $LaCaCrO_3$, $YCrO_3$, $LaCrO_3$, $LaCoO_3$, $CaCrO_3$, $CaCoO_3$, $LaNiO_3$, $LaCrO_3$, $CaNiO_3$, $CaCrO_3$, and a combination thereof. In another particular embodiment, the interconnect layer can comprise LST (or YST), and may consist essentially of a doped LST, such as, $La_{0.2}Sr_{0.8}TiO_3$ having one or more dopants (e.g., Nb or Sr). In some applications, the interconnect layer can include other known material that is suitable for forming an interconnect layer. The interconnect layer can have a certain thickness, such as in a range from 1 micron to 1 mm or in a range from 10 microns to 500 microns or in a range from 30 microns to 300 microns.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

An electrochemical device, comprising a cathode layer, wherein the cathode layer comprises:
  an ionic conductor material and an electronic conductor material;
  a median surface diffusion length (Ls) greater than 0.33 microns; and
  a ratio (Vi/Ve) of a volume of the ionic conductive material (Vi) to a volume of the electronic conductor material (Ve) of at least 1.3.

Embodiment 2

An electrochemical device, comprising a cathode layer, wherein the cathode layer comprises:
  an ionic conductor material and an electronic conductor material;
  a median surface diffusion length (Ls) and a mean boundary layer length (lδ), wherein a ratio of Ls to lδ is greater than 1.1; and
  a ratio of (Vi/Ve) of a volume of the ionic conductor material (Vi) to a volume of the electronic conductor material (Ve) of at least 1.3.

Embodiment 3

The electrochemical device of any of the preceding embodiments, wherein the Ls is greater than 0.33 or at least 0.35 or at least 0.39 microns.

Embodiment 4

The electrochemical device of any of the preceding embodiments, wherein the Ls is less than 0.57 microns.

Embodiment 5

The electrochemical device of any of the preceding embodiments, wherein the ionic conductor material comprises a scandia stabilized zirconia.

Embodiment 6

The electrochemical device of any of the preceding embodiments, wherein the ionic conductor material comprises a scandia ceria stabilized zirconia.

Embodiment 7

The electrochemical device of any of the preceding embodiments, wherein the ionic conductor material comprises 10Sc1CeZrO2.

Embodiment 8

The electrochemical device of any of the preceding embodiments, wherein the cathode layer comprises a boundary layer length ($l\delta$), wherein a ratio of Ls/$l\delta$ is greater than 1.1, or at least 1.2.

Embodiment 9

The electrochemical device of any of the preceding embodiments, wherein the ratio of Ls/$l\delta$ is at most 3.0 or at most 2.9 or at most 2.8 or at most 2.7, or at most 2.6 or at most 2.5 or at most 2.4 or at most 2.3 or at most 2.2 or at most 2.1 or at most 2.0 or at most 1.9 or at most 1.8 or at most 1.7 or at most 1.6.

Embodiment 10

The electrochemical device of any of the preceding embodiments, wherein the cathode layer comprises a ratio (Vi/Ve) of a volume of the ionic conductive material (Vi) to a volume of the electronic conductive material (Ve) of at least 1.6, at least 1.8, at least 2.3, or at least 3.

Embodiment 11

The electrochemical device of any of the preceding embodiments, wherein the cathode layer comprises a ratio (Vi/Ve) of a volume of the ionic conductive material (Vi) to a volume of the electronic conductive material (Ve) of greater than 2.5 or at least 3.

Embodiment 12

The electrochemical device of any of the preceding embodiments, wherein the cathode layer comprises a ratio (Vi/Ve) of a volume of the ionic conductive material (Vi) to a volume of the electronic conductive material (Ve) of at most 4.

Embodiment 13

The electrochemical device of any of the preceding embodiments, wherein the cathode layer comprises a porosity of at least 15 vol %.

Embodiment 14

The electrochemical device of any of the preceding embodiments, wherein the cathode layer comprises a porosity of at most 40 vol %.

Embodiment 15

The electrochemical device of any of the preceding embodiments, wherein the cathode layer comprises at least 50 vol % of the ionic conductor material of a total volume of the cathode layer.

Embodiment 16

The electrochemical device of any of the preceding embodiments, wherein the cathode layer comprises at most 70 vol % of the ionic conductor material of a total volume of the cathode layer.

Embodiment 17

The electrochemical device of any of the preceding embodiments, wherein the cathode layer comprises at least 15 vol % of the electronic conductor material of a total volume of the cathode layer.

Embodiment 18

The electrochemical device of any of the preceding embodiments, wherein the cathode layer comprises at most 35 vol % of the electronic conductor material of a total volume of the cathode layer.

Embodiment 19

The electrochemical device of any of the preceding embodiments, wherein the ionic conductor material comprises a stabilized zirconia, a ceria, or any combination thereof.

Embodiment 20

The electrochemical device of any of the preceding embodiments, wherein the ionic conductor material comprises 8YSZ.

Embodiment 21

The electrochemical device of any of embodiments 1 to 19, wherein the ionic conductor material comprises a ceria based material.

Embodiment 22

The electrochemical device of embodiment 21, wherein the ionic conductor material comprises samarium or gadolinium doped ceria.

Embodiment 23

The electrochemical device of any of embodiments 1 to 19, wherein the ionic conductor material consists essentially of 10Sc1CeZrO2.

Embodiment 24

The electrochemical device of any of the preceding embodiments, wherein the electronic conductor material comprises a spinel.

Embodiment 25

The electrochemical device of any of embodiments 1 to 23, wherein electronic conductor material comprises a perovskite.

Embodiment 26

The electrochemical device of any of embodiments 1 to 23 and 25, wherein the electronic conductor material comprises a lanthanum strontium manganite.

Embodiment 27

The electrochemical device of any of the preceding embodiments, wherein the cathode layer comprises a density of a triple point boundary greater than $0.30/\mu m2$.

Embodiment 28

The electrochemical device of any of the preceding embodiments, wherein the cathode layer comprises a ratio (di/de) of an average particle size of the ionic conductor material (di) to an average particle size of the electronic conductor material (de) of greater than 1.0 and at most 4.8.

Embodiment 29

The electrochemical device of any of the preceding embodiments, wherein the electrochemical device further comprises an electrolyte layer, wherein the cathode layer is disposed adjacent the electrolyte layer.

Embodiment 30

The electrochemical device of embodiment 29, wherein the cathode layer is a cathode functional layer disposed between the electrolyte layer and a cathode bulk layer.

Embodiment 31

The electrochemical device of any of the preceding embodiments, wherein the electrochemical device comprises a solid oxide fuel cell including the cathode layer.

Embodiment 32

The electrochemical device of any of the preceding embodiments, wherein the electrochemical device comprises a plurality of solid oxide fuel cells including the cathode layer.

Embodiment 33

The electrochemical device of any of embodiments 1 to 30, wherein the electrochemical device comprises a solid electrolyzer cell including the cathode layer.

Embodiment 34

The electrochemical device of any of embodiments 29 to 33, further comprising an anode functional layer adjacent the electrolyte layer.

Embodiment 35

The electrochemical device of embodiment 34, wherein the anode functional layer comprises an electronic conductor material and an ionic conductor material.

Embodiment 36

The electrochemical device of embodiment 35, wherein the ionic conductor material of the anode functional layer comprises a zirconia based material.

Embodiment 37

The electrochemical device of embodiment 35 or 36, wherein the ionic conductor material of the anode functional layer comprises scandia stabilized zirconia.

Example 1

Figure 6:
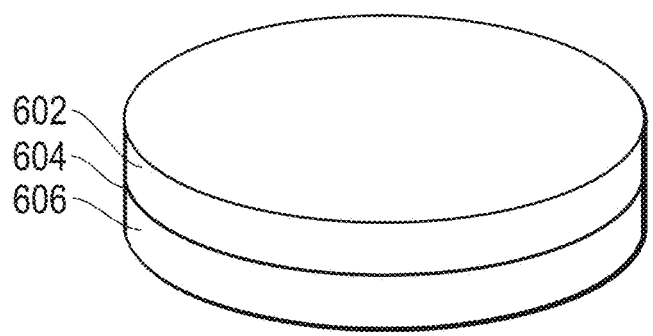
FIG. 6 includes an illustration of a symmetric half cell in accordance with an embodiment described herein.

Half symmetric button cells were formed. FIG. 6 includes a schematic of the half cells. Each half cell included an electrolyte layer 604 between cathode layers 602 and 606. The half cells were formed having the surface areas of 1 inch$^2$ and the characteristics noted in Table 2. Green tapes of the cathode layers and electrolyte layers were formed separately. The green electrolyte layers of all the symmetric half cells were made of 8YSZ. The green cathode layers were formed with different contents of LSM and YSZ having different average particle diameters as disclosed in Table 1 below. Graphite pore formers were added to the slurries of the cathode layers to generate porosities noted in Table 2 below. The total of the graphite pore formers, LSM, and YSZ makes up to 100% for each sample. Discs of each green layer were mechanically punched out and layered as depicted in FIG. 6. The layers were laminated at elevated temperature (200° F.) and pressure (10,000 psi). The laminated structure was sintered at a maximum temperature of 1280° C. and a maximum pressure of 12 MPa to form the half cells.

TABLE 1

| Sample | D$_{50}$ of 8YSZ (d$_{(50i)}$) | D$_{50}$ of LSM (d$_{(50e)}$) | d$_{50(i)}$/d$_{50(e)}$ | LSM (vol %) | 8YSZ (vol %) |
|---|---|---|---|---|---|
| S1 | 2.6 | 1.4 | 1.9 | 38 | 62 |
| S2 | 2.6 | 2.3 | 1.1 | 38 | 62 |
| S3 | 2.5 | 1.4 | 1.8 | 38 | 62 |
| S4 | 0.8 | 1.4 | 0.6 | 38 | 62 |

The charge transfer resistance (Rct) of the symmetric half cells was tested. Alternate current (AC) impedance tests were performed on the cells at open circuit condition in the frequency range of 65 kHz to 0.02 Hz. Rct was derived from the Cole-Cole plot of AC impedance measurement results, by deconvoluting the low frequency resistance from the total resistance.

The TPB points per area in the cathode functional layers were examined in the same manner as Ls except the number of intersections of the three phases (LSM, YSZ, and pore) counted and divided by the image area. Ls was measured and lδ determined as described in this disclosure.

TABLE 2

| Sample | Volume content ratio (Vi/Ve) | l_TPB (/um²) | Porosity (vol %) | Rct/cell (ohm · cm²) | Ls (um) | Ls/lδ |
|---|---|---|---|---|---|---|
| S1 | 1.63 | 0.23 | 11 | 0.79 | 0.38 | 1.0 |
| S2 | 1.63 | 0.32 | 20 | 0.57 | 0.54 | 1.5 |
| S3 | 1.63 | 0.33 | 15 | 0.53 | 0.41 | 1.6 |
| S4 | 1.63 | 0.32 | 12 | 1.05 | 0.26 | 0.6 |

Example 2

Figure 7:
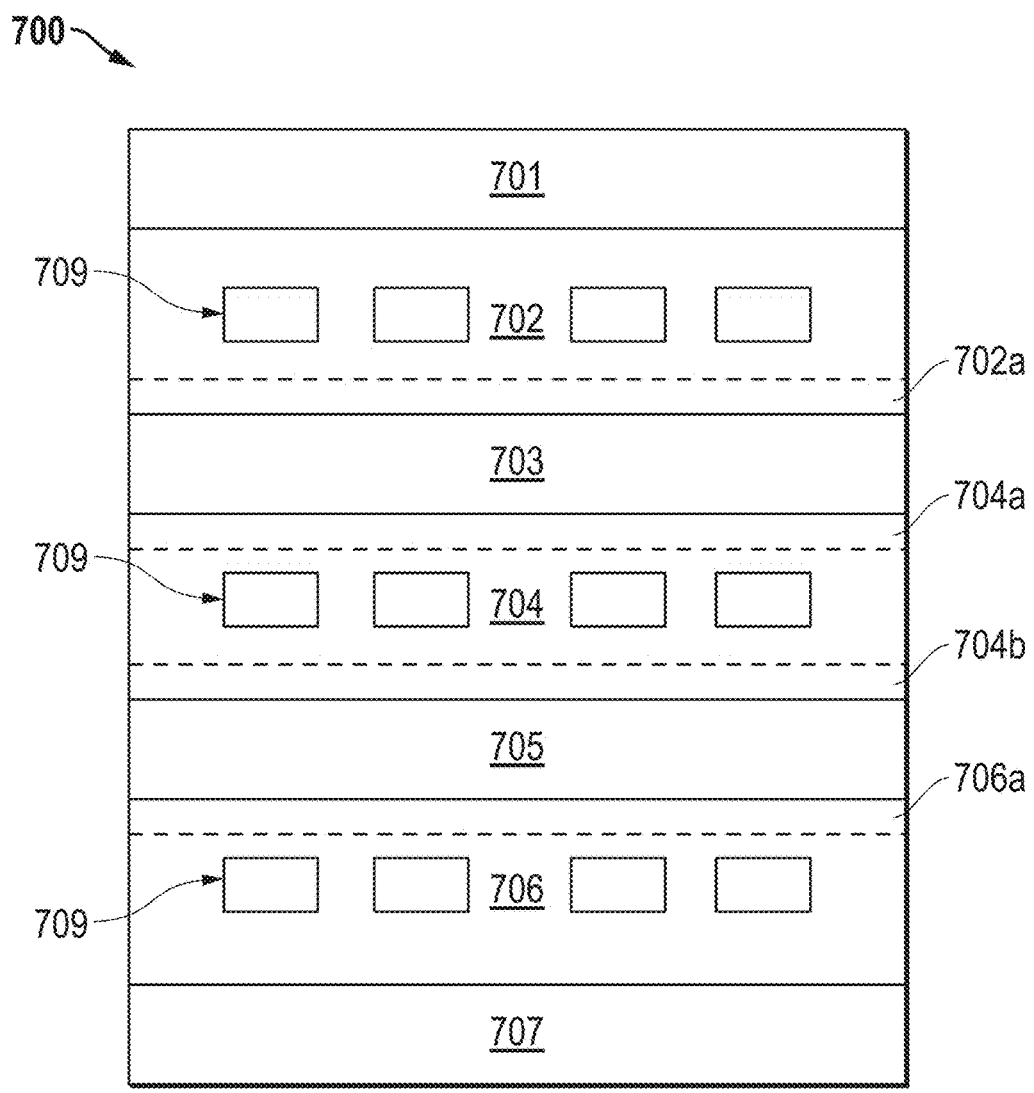
FIG. 7 includes an illustration of a symmetric stack according to an embodiment described herein.

Symmetric cathode stacks were formed having the structure of the stack 700 as illustrated in FIG. 7. Each symmetric cathode stack included alternating electrolyte (703 and 705) and cathode layers (702, 704, and 706). Cathode functional layers 702a, 704a, 704b and 706a were disposed between the cathode and electrolyte layers. The current collectors 701 and 707 were the top and bottom layers of the stack, respectively, and each was in direct contact with a cathode layer (702 or 706). The cathode layers included gas channels 709.

Green tapes of the layers were formed. Channels were laser-cut in the green cathode layers. The electrolyte layers were formed with 8YSZ. The cathode functional layers were made of LSM and 8YSZ powders as disclosed in Table 3. The current collector layers were formed with LSM. Platinum (Pt) mesh (not shown) was held against the current collector layers at the top and bottom of the stack, and Pt wires were attached for electrical connections. The stack was placed in a furnace to control the temperature to 800° C. The Pt wires were extended outside the furnace and connected to an impedance analyzer.

TABLE 3

| Sample | $D_{50}$ of 8YSZ $(D_{50(i)})$ (μm) | $D_{50}$ of LSM $(D_{50(e)})$ (μm) | $D_{50(i)}/D_{50(e)}$ | LSM (vol %) | 8YSZ (vol %) |
|---|---|---|---|---|---|
| S5 | 2.0 | 1.1 | 1.8 | 38 | 62 |
| S6 | 2.0 | 1.1 | 1.8 | 30 | 70 |
| S7 | 5.3 | 1.1 | 4.8 | 30 | 70 |
| S8 | 2.0 | 1.1 | 1.8 | 25 | 75 |
| S9 | 2.0 | 1.1 | 1.8 | 20 | 80 |

Performance and microstructure features of the stacks are included in Table 4 below. The charge transfer resistance (Rct) of the symmetric stacks was tested in the same manner as disclosed in Example 1. The area specific resistance was derived by deconvoluting the high frequency ohmic resistance from the Cole-Cole plots obtained from AC impedance measurements.

TABLE 4

| Sample | $V_i/V_e$ | Ls (μm) | l_TPB (/μm²) | ASR (ohm · cm² per CFL) | Rct (ohm · cm² per CFL) | Ls/lδ |
|---|---|---|---|---|---|---|
| S5 | 1.29 | 0.57 | 0.40 | 0.09 | 1.32 | 0.76 |
| S6 | 2.33 | 0.43 | 0.32 | 0.09 | 1.03 | 1.33 |
| S7 | 2.33 | 0.47 | 0.21 | 0.08 | 0.99 | 1.11 |
| S8 | 3.00 | 0.39 | 0.31 | 0.10 | 0.82 | 1.29 |
| S9 | 4.00 | 0.33 | 0.29 | 0.20 | 1.3 | 1.1 |

Example 3

Solid oxide fuel cell (SOFC) samples were formed having the same structure as illustrated in FIG. 4. The cathode functional layer of sample S10 was formed with 25 vol % of LSM and 75 vol % of 8YSZ, and S11 25 vol % LSM and 75 vol % 10Sc1CeSZ. 20 wt % graphite pore former were used for each sample to induce pores. The $d_{50(i)}$, $d_{50(j)}$, and ratios of $d_{50(i)}/d_{(50e)}$ are included in Table 6. All the other layers of samples S10 and S11 had the same compositions as noted in Table 6.

TABLE 5

| Sample | $d_{50(i)}$ | $d_{50(e)}$ | $d_{50(i)}/d_{(50e)}$ |
|---|---|---|---|
| S10 | 2.6 | 1.3 | 2.0 |
| S11 | 2.0 | 1.3 | 1.5 |

Green tapes of each layer were formed separately and then assembled to have the structure illustrated in FIG. 3. The layers were laminated at elevated temperature (200° F.) and pressure (10,000 psi). The laminated structure was sintered at a maximum temperature of 1280° C. and a maximum pressure of 12 MPa to form a SOFC containing the cathode functional layer.

TABLE 6

| | Composition (wt %) |
|---|---|
| Anode bulk layer | 36.4% NiO |
| | 63.6% 10YSZ |
| Anode functional layer | 54.0% NiO |
| | 46.0% 10YSZ |
| Electrolyte layer | 97.8% 8YSZ |
| | 0.4% $Al_2O_3$ |
| | 1.8% $Mn_2O_3$ |
| Cathode bulk layer | 100% LSM |

Performance (ASR, Rct, and power density) of the samples were tested, and the cathode functional layers was analyzed, results of which are included in Table 7. Electrochemical testing was performed on the samples to measure maximum power density, which is a measurement of the maximum amount of power that the SOFC can produce normalized to the SOFC's area. The edge of the SOFC samples were sealed with glass to prevent leakage of the gases. The SOFC samples were then mounted in an apparatus that can deliver hydrogen to the anode layer and air to the cathode layer. Forming gas, 4% hydrogen in nitrogen, was flowed to the anode at 300 scc/min. The cells were heated up at 4° C./min to 800° C. The hydrogen concentration flowing to the anode layer was increased step by step to reduce NiO to nickel. When the open-circuit voltage (OCV) was stable with 100% hydrogen gas flowing to the anode layer, three current-voltage (IV) curves were recorded. The maximum power density of the samples was defined by the maximum current*voltage normalized to the SOFC's active area.

TABLE 7

| Sample | Vi/Ve | Ls (um) | l_TPB (/um²) | ASR (ohm · cm²) | Rct (ohm · cm²) | Power density (mW/cm²) at 0.8 V |
|---|---|---|---|---|---|---|
| S10 | 3.00 | 0.47 | 0.29 | 0.17 | 1.04 | 254 |
| S11 | 3.00 | 0.45 | 0.31 | 0.18 | 0.65 | 294 |

The present embodiments represent a departure from the state of the art. It was unexpectedly and surprisingly discovered that the significantly better performance of an electrochemical device (e.g., a cell) can be achieved by, for example, including forming an improved microstructure of a cathode layer, having features such as a certain Ls (e.g., greater than 0.33 microns), a certain Vi/Ve ratio, or a combination thereof.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electrochemical device, comprising:
    a cathode layer;
    an anode layer; and
    an electrolyte layer disposed between the cathode layer and the anode layer, wherein the cathode layer comprises:
    a mixture including an ionic conductor material and an electronic conductor material, wherein the electronic conductor material comprises a spinel, a perovskite, a lanthanum strontium manganite, or a combination thereof;
    a median surface diffusion length (Ls) greater than 0.33 microns and less than 0.57 microns, wherein surface diffusion length (Ls) refers to half of a length of an interface between a pore and the electronic conductor material; and
    a ratio (Vi/Ve) of a volume of the ionic conductive material (Vi) to a volume of the electronic conductor material (Ve) of at least 1.3.

2. The electrochemical device of claim 1, wherein the Ls is not greater than 0.43 microns.

3. The electrochemical device of claim 1, wherein the cathode layer comprises at least 50 vol % and at most 70 vol % of the ionic conductor material of a total volume of the cathode layer.

4. The electrochemical device of claim 1, wherein the ratio (Vi/Ve) of the volume of the ionic conductive material (Vi) to the volume of the electronic conductive material (Ve) is at most 4.

5. The electrochemical device of claim 1, wherein the ionic conductor material comprises a stabilized zirconia, a ceria, or any combination thereof.

6. The electrochemical device of claim 5, wherein the ionic conductor material comprises a scandia stabilized zirconia.

7. The electrochemical device of claim 6, wherein the ionic conductor material comprises a scandia ceria stabilized zirconia.

8. The electrochemical device of claim 5, wherein the ionic conductor material comprises samarium or gadolinium doped ceria.

9. The electrochemical device of claim 5, wherein the ionic conductor material comprises $10Sc1CeZrO_2$.

10. The electrochemical device of claim 1, wherein the electronic conductor material comprises a lanthanum strontium manganite.

11. The electrochemical device of claim 1, wherein the cathode layer comprises a porosity of at least 15 vol % and at most 40 vol % for a total volume of the cathode.

12. The electrochemical device of claim 3, wherein the cathode layer comprises a mean boundary layer length (lδ), wherein a ratio of Ls to lδ is greater than 1.1 and at most 3.0.

13. The electrochemical device of claim 1, wherein the cathode layer comprises at least 15 vol % and at most 35 vol % of the electronic conductor material of a total volume of the cathode layer.

14. An electrochemical device, comprising:
    a cathode layer,
    an anode layer; and
    an electrolyte layer disposed between the cathode layer and the anode layer, wherein the cathode layer comprises:

a mixture including an ionic conductor material and an electronic conductor material, wherein the electronic conductor material comprises a spinel, a perovskite, a lanthanum strontium manganite, or a combination thereof;

a median surface diffusion length (Ls) and a mean boundary layer length (lδ), wherein a ratio of Ls to lδ is greater than 1.1 and at most 3.0, wherein surface diffusion length (Ls) refers to half of a length of an interface between a pore and the electronic conductor material; and ratio of (Vi/Ve) of a volume of the ionic conductor material (Vi) to a volume of the electronic conductor material (Ve) of at least 1.3.

15. The electrochemical device of claim 14, wherein the Ls is not greater than 0.43 microns.

16. The electrochemical device of claim 14, wherein the cathode layer comprises a ratio (di/de) of an average particle size of the ionic conductor material (di) to an average particle size of the electronic conductor material (de) of greater than 1.0 and at most 4.8.

17. The electrochemical device of claim 14, wherein the ratio (Vi/Ve) of the volume of the ionic conductive material (Vi) to the volume of the electronic conductive material (Ve) is at least 1.6 and at most 4.

18. The electrochemical device of claim 14, further comprising an electrolyte and a cathode bulk layer, wherein the cathode layer is a cathode functional layer and disposed between the electrolyte layer and the cathode bulk layer.

19. The electrochemical device of claim 14, wherein the electrochemical device comprises a solid electrolyzer cell including the cathode layer.

20. The electrochemical device of claim 14, wherein the electrochemical device comprises at least one solid oxide fuel cell including the cathode layer.

* * * * *